United States Patent
Kim et al.

(10) Patent No.: US 6,766,144 B2
(45) Date of Patent: Jul. 20, 2004

(54) METHOD AND APPARATUS FOR ESTIMATING OPTIMUM WEIGHT OF CLOSED LOOP TRANSMIT DEVERSITY FOR MOBILE COMMUNICATION

(75) Inventors: Sung-jin Kim, Suwon (KR); Yong-suk Lee, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 641 days.

(21) Appl. No.: 09/829,399

(22) Filed: Apr. 10, 2001

(65) Prior Publication Data

US 2002/0013130 A1 Jan. 31, 2002

(30) Foreign Application Priority Data

Apr. 10, 2000 (KR) .................................... 2000-18669

(51) Int. Cl.[7] .......................... H04B 1/10; H04B 15/00; H04B 1/00; H04B 7/00; H05C 7/02
(52) U.S. Cl. ..................... 455/67.11; 455/63.1; 455/69; 455/101
(58) Field of Search .............................. 455/63.1, 67.11, 455/67.13, 69, 70, 101, 103, 92, 115.1, 226.1, 562.1; 342/368, 373; 370/334; 375/267, 358, 148, 299, 219, 144

(56) References Cited

U.S. PATENT DOCUMENTS

| 5,315,532 | A | | 5/1994 | Comon |
|---|---|---|---|---|
| 5,471,647 | A | | 11/1995 | Gerlach et al. ................ 455/63 |
| 5,634,199 | A | | 5/1997 | Gerlach et al. ................ 455/63 |
| 6,067,324 | A | * | 5/2000 | Harrison ...................... 375/267 |
| 6,373,433 | B1 | * | 4/2002 | Espax et al. ................. 342/368 |
| 6,393,257 | B1 | * | 5/2002 | Holtzman ................. 455/67.13 |
| 6,584,161 | B2 | * | 6/2003 | Hottinen et al. ............ 375/299 |
| 6,594,473 | B1 | * | 7/2003 | Dabak et al. ............... 455/101 |
| 2001/0033622 | A1 | * | 10/2001 | Jongren et al. ............. 375/267 |
| 2002/0012333 | A1 | * | 1/2002 | Yoshida et al. ............. 370/335 |

FOREIGN PATENT DOCUMENTS

| EP | 0 807 989 | 11/1997 |
|---|---|---|
| FR | 2657173 | 7/1991 |
| WO | 98/24192 | 6/1998 |

* cited by examiner

*Primary Examiner*—Vivian Chin
*Assistant Examiner*—Raymond B Persino
(74) *Attorney, Agent, or Firm*—Lee & Sterba, P.C.

(57) ABSTRACT

An optimum weight estimating apparatus and method of a mobile station for a mobile communication system in which a base station uses closed transmit diversity technology. Conventionally, all weight vectors stored in a lookup table should be applied to an optimum weight estimator to calculate receiving power, so that the amount of calculation considerably increases when there are many antennas. To overcome this problem, the weights of the lookup table are appropriately adjusted so that the variation of the differences between two adjacent vectors can be minimized. An optimum weight is obtained using the difference vector between weight vectors, thereby simplifying the calculation of receiving power. Therefore, the power loss of the mobile station can be minimized.

18 Claims, 5 Drawing Sheets

METHOD AND APPARATUS FOR ESTIMATING OPTIMUM WEIGHT OF CLOSED LOOP TRANSMIT DEVERSITY FOR MOBILE COMMUNICATION

BACKGROUND OF THE INVENTION

1. Field of the Invention

The present invention relates to a mobile station in a mobile communication system using a closed loop transmit diversity technique in a base station and, more particularly, to an optimum weight estimating method and apparatus for selecting a desirable signal from a mobile station using a multi-path effect.

2. Description of the Related Art

Third-generation mobile communication systems are the standards for transmitting data at a higher rate than a second-generation personal communication system (PCS). A synchronous wideband code division multiple access (WCDMA) mode is standardized as a wireless access specification in both Europe and Japan. A synchronous multi-carrier CDMA (CDMA-2000) mode is standardized as a wireless access specification in North America. Mobile communication systems are configured such that a plurality of mobile stations communicate via a single base station.

Fading should be overcome to achieve fast data transmission in a mobile communication system. Fading reduces the amplitude of a receiving signal from several decibels (dB) to several tens of decibels (dB). To overcome such a fading problem, a variety of diversity techniques have been employed.

The CDMA mode employs a rake performing diversity reception using a delay spread of a channel. The rake is a multi-path diversity technique. This diversity technique has a disadvantage in that it does not operate when a delay spread is small. Time diversity using interleaving and coding schemes is employed in channels having a Doppler spread. It is difficult to use this diversity in a slow Doppler channel.

Space diversity is used in an indoor channel having a small delay spread and a pedestrian channel falling under a slow Doppler channel to overcome fading. The space diversity technique uses at least two antennas. When a signal forwarded from one antenna is reduced due to fading, the signal forwarded from the other is received.

The space diversity technique is divided into receive diversity using receiving antennas and transmit diversity using transmitting antennas. Since it is difficult to apply the receive diversity in aspect of the area of a mobile terminal (or a mobile station) and the installing cost, use of transmit diversity in a base station has been recommended.

The transmit diversity includes closed loop transmit diversity operating based on downlink channel information fed back from a mobile station and open loop transmit diversity without feedback. When using L antennas, the closed transmit diversity is more beneficial than the open transmit diversity by L times in terms of a signal to interference/noise ratio (SINR).

The performance of the closed loop transmit diversity operating based on feedback channel information is influenced by a feedback period. When the feedback period is long, a channel changes before feedback information arrives at a mobile station, thereby decreasing performance. When a large amount of information is fed back over a unit time to track a fast changing channel, uplink capacity drops, thereby decreasing performance.

The transmit diversity is divided into a maximal ratio combine (MRC) mode, an equal gain combine (EGC) mode and a selective combine (SC) mode according to a diversity combine mode. Unlike the MRC mode, the EGC mode does not consider the difference in gain between two antennas, and thus performance is degraded.

The SC mode selects a signal of an antenna having the largest gain. When a signal is received through a multi-path, determining an optimum weight for a multi-transmitting antenna becomes more complicated as the number of transmitting antennas increases. There is enough time to determine an optimum weight since calculation is performed once during each period of weight feedback, but a simpler weight determination algorithm is desired in aspect of hardware and power efficiency.

U.S. Pat. Nos. 5,634,199 and 5,471,647 relate to using transmit diversity as a feedback mode. These patents propose a feedback method and a channel measurement using a perturbation algorithm and a gain matrix, but this method is a blind method and is not usually used in a system having a pilot because a convergent speed is slow, and it is more difficult to find an accurate weight according to this method as compared with the present invention.

There has also been proposed a method of searching for an optimum channel according to an eigen method using a quantized weight vector lookup table. Channel information to be fed back should be quantized. The amount of calculation is reduced since quantization is considered in a step of obtaining a weight.

This method is based on a theory that an eigen vector corresponding to the maximum eigen value of the correlation matrix of a channel matrix is an optimum weight vector with the correlation matrix being obtained from channels received through a multi-path and an antenna path. All weight vector stored in the lookup table are applied to an estimator, and a weight vector that maximizes receiving power is set as an optimal weight vector. In this method, receiving power should be calculated with respect to all the weights, so that the amount of calculation considerably increases when there are many antennas.

SUMMARY OF THE INVENTION

A feature of an embodiment of the present invention provides an apparatus and method for minimizing power loss in a mobile station by reducing the number of calculation of weights in transmit diversity employed for improving the performance of the mobile station.

According to another feature of an embodiment of the present invention, there is provided an optimum weight estimator of a mobile station in a mobile communication system in which a base station uses closed transmit diversity technology. The optimum weight estimator includes a channel separator for separating a multi-path channel from a signal of the base station and outputting a channel matrix signal, a weight vector set generator for encoding a weight using a fixed point method and outputting a weight vector matrix signal, a weight vector determiner for outputting an optimum weight in response to the channel matrix signal and the weight vector matrix signal, and an optimum weight feedback unit for outputting a signal for feeding back the optimum weight signal to the base station.

In accordance with another aspect of the present invention, there is provided an optimum weight estimating method of a mobile station in a mobile communication system in which a base station uses closed transmit diversity technology. The optimum weight estimating method includes the steps of (a) separating a multi-path channel from a signal of the base station and outputting a channel matrix signal, (b) encoding a weight using a fixed point method and outputting a weight vector matrix signal, (c) outputting an optimum weight in response to the channel matrix signal and the weight vector matrix signal, and (d) outputting a signal for feeding back the optimum weight signal to the base station.

BRIEF DESCRIPTION OF THE DRAWINGS

The above features and advantages of embodiments of the present invention will become more apparent by describing in detail preferred embodiments thereof with reference to the attached drawings in which.

DETAILED DESCRIPTION OF THE PRESENT INVENTION

Figure 1:
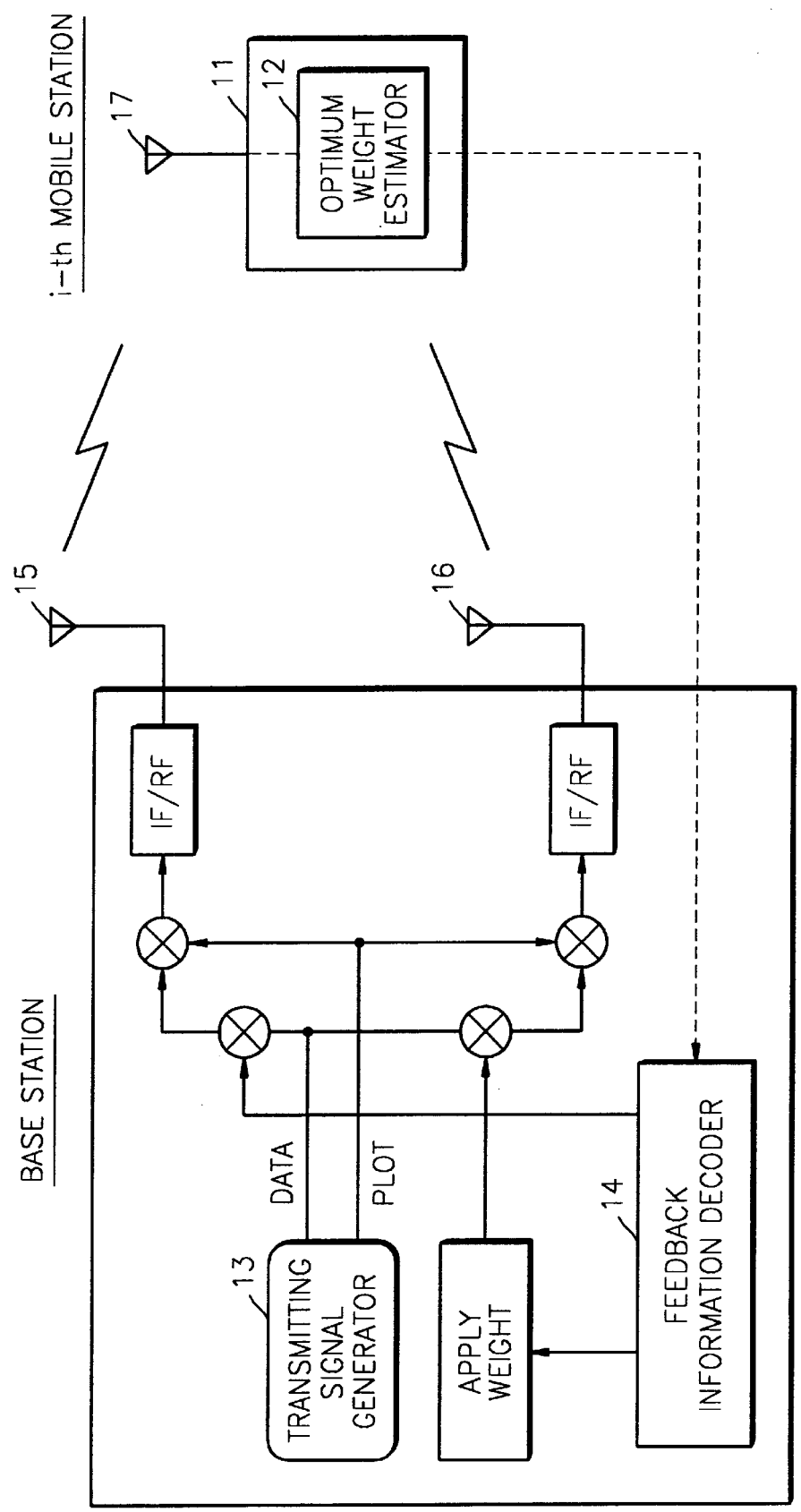
FIG. 1 is a schematic diagram illustrating the configuration of a mobile communication system using transmit diversity.

Korean Application Serial No. 00-18669, filed Apr. 10, 2000, entitled "Method and Apparatus For Estimating Optimum Weight of Closed Loop Transmit Diversity For Mobile Communication," is incorporated by reference herein in its entirety.

A preferred embodiment of the present invention will now be described in detail with reference to the attached drawings, wherein the same reference numerals denote the same members.

According to an operating principle of the present invention, a mobile station obtains a weight for transmit diversity and sends it to a base station. An optimum weight is for maximizing a receiving signal to interference/noise ratio (SINR). When it is assumed that an i-th user's receiving channel is $H_i$, a receiving SINR is as follows.

$$SINR^R(i) = (w_i^H H_i^H H_i w_i P_i^T) / \left( \sum_{j=1, j \neq i}^{I} w_j^H H_j^H H_j w_j P_j^T \right) \quad (1)$$

where $i=1, 2, \ldots I$, $H_i$ and $w_i$ indicate the channel matrix and the weight vector, respectively, of the i-th user, I is the number of users, and $P_i^T$ is the transmission power of the i-th user. When it is assumed that interference is constant regardless of users to reduce the amount of calculation, maximizing the receiving SINR is considered as maximizing receiving power. A receiving power register value P of a user is expressed by Equation (2).

$$P = w^H H^H H w \quad (2)$$

Under the assumption that the same amount of interference exerted on users, a user index is omitted. When a weight is encoded using a fixed point scheme for feedback, a certain weight vector code book matrix $C_w$ is obtained. The weight vector code book matrix $C_w$ can be expressed by $C_w = [w_1 w_2 \ldots w_K]^T$, and K is the maximum number of weight vectors. $w_K = [w_k(1)\ w_k(2) \ldots w_k(L)]^T$, $w_k(I)$ is a weight for an I-th antenna, and L is the number of antennas.

In the case where it is assumed that the number of antennas L is 4, and $w_k(1)=1$, $\forall k$, when $w_k(1)=1$, $\exists k$ is one of $\{1, -1\}$, the maximum number of weight vectors $K=N^{L-1}=2^3=8$, where N indicates the number of possible values of each weight. In this case, a code book is expressed by Equation (3).

$$(C_w|)_{L=4, K=8} = \begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & 1 & 1 & -1 & -1 \\ 1 & -1 & 1 & -1 & 1 & -1 & 1 & -1 \end{bmatrix} \quad (3)$$

Generally, the amount of multiplying calculation performed to obtain receiving power $P_k = w_k^H R w_k$ is $O(L^2+L)$. A correlation matrix $R = H^H H$ and is determined before iteration regardless of k.

An algorithm for obtaining k satisfying $$P_{max} = \max_{k} P_k$$

is as follows.

(1) For k=1:k
(2) $W=C_w(:,k)$;
(3) $P=W^k \times R \times w$
(4) if $P > P_{max}$ then $k_{opt}=k$, $P_{max}=P$
(5) end.

In the above algorithm, (1) k is set to 1
(2) A k-th weight vector is brought from a weight vector lookup table.
(3) A receiving power register value P is obtained using the k-th weight vector of the weight vector lookup table.
(4) Step (5) is performed when the receiving power register value P exceeds the existing maximum receiving power value $P_{max}$, and step (6) is performed when the receiving power register value P does not exceed the existing maximum receiving power value $P_{max}$.
(5) An optimum weight index is set to k, the maximum receiving power value $P_{max}$ is replaced with the currently obtained receiving power register value P.
(6) The value of k is increased by 1, the algorithm ends when k is larger than the number of possible weight vectors, and the step (2) is performed when k is not larger than the number of possible weight vectors.

The total number of multiplications performed in the above algorithm is $O(N^{L-1} \times (L^2+L))$ that is the product of the total number of iterations, $K=N^{L-1}$, and the number of instantaneous multiplications, $L^2+L$.

The algorithm according to the present invention is proposed to reduce the amount of calculation for obtaining the receiving power value $P_k$. When a weight vector is set as a minimal changing list under the condition that weights for each of the antenna are independent on the weight vector list, the order of the amount of calculation decreases by 1. When the difference between weight vectors on this list is set as a difference vector, the difference vector is defined as:

$$\Delta W_k = W_k - W_{k-1}.$$

This difference vector is composed of L elements among which only one element is non-zero and the other elements are all zeros. The list of Equation (3) is converted into the minimal changing list as shown in Equation (4).

$$(C_w)_{L=4,K=8} = \begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & -1 & -1 & 1 & 1 & -1 & -1 & 1 \end{bmatrix} \quad (4)$$

The minimal changing list minimizes the variation of the difference between two adjacent vectors. Only the minimum number of elements are changed. The equation for obtaining the receiving power $P_k$ can be expressed differently using $\Delta w_k$ as Equation (5).

$$P_k = P_K + 2Re[\Delta w_k^H R w_{k-1}] + \Delta w_k^H R \Delta w_k \quad (5)$$

When a temporary value is defined as $q_k = R w_{k-1} = q_{k-1} + R \Delta w_k$, Equation (5) can be restated like Equation (6).

$$P_k = P_{k-1} + 2Re[\Delta w_k^H q_{k-1}] + \Delta w_k^H \Delta q_k \quad (6)$$

where $\Delta q_k = q_k - q_{k-1}$.

Equation (6) can be more simplified as Equation (7) using the characteristic that all elements of a vector $\Delta w_k$ except one element are 0.

$$P_k = P_{k-1} + 2Re[\Delta w_k(i_k)^* q_{k-1}(i_k)] + \Delta w_k(i_k)^* \Delta q_k(i_k) \quad (7)$$

where $q_k = q_{k-1} + \Delta q_k$, $\Delta q_k = R(:,i_k) \Delta w_k(i_k)$.

The amount of operation in a method proposed by the present invention is O(L+2). According to a method proposed by the present invention, a new code book is expressed by Equation (8) to reduce the size of the code book.

$$\Delta C_w = \begin{bmatrix} \Delta w_2(i_2) & \Delta w_3(i_3) & \dots & \Delta w_k(i_k) \\ i_2 & i_3 & \dots & i_k \end{bmatrix} \quad (8)$$

The size of the code book is reduced to about 2/L compared to a conventional method. The code book defined by Equation (4) can be expressed by a new code book as Equation (9).

$$\Delta C_w = \begin{bmatrix} -2 & -2 & -2 & -2 & -2 & -2 & -2 \\ 1 & 2 & 1 & 3 & 1 & 2 & 1 \end{bmatrix} \quad (9)$$

Since a method according to the present invention aims at finding an optimal k for maximizing the receiving power $P_k$, $P_1$ can be set to a random value such as 0.

A new code book composed of the difference between vectors is referred to as a difference code book. For column vectors each composed of two elements in the difference code book, the same pattern is repeated at intervals of a multiple of N due to the characteristics of non-binary encoding. N is the number of possible values of a weight for each antenna. When a random column vector $[\Delta w_k(i_k) i_k]$ has the same pattern as that of the previous column vector, the value of $\Delta q_k == R(:,i_k) \Delta w_k(i_k)$ in Equation (9), which corresponds to the amount O(N) of calculation, is not calculated again but is fetched from the lookup table saving previously calculated values. When this method is used for the difference code book, the total number of multiplications is reduced from:

$$O((N^{L-4}-1) \times (L+2))|_{n=2, L=4} = O(42) \text{ to } O(3 \times (L+2) + 4 \times 2))|_{L=4} = 26$$

Table 1 compares the amounts of multiplying calculation with respect to a conventional code book method, a difference code method and a method of using a lookup table for reducing redundant calculation in obtaining the difference code method.

TABLE 1

| Weight estimating method | Conventional code book method | Difference code book method Not use lookup table | Difference code book method Use lookup table |
|---|---|---|---|
| Number of multiplications (L = 4, N = 2) | 160 | 42 | 26 |

When the minimal changing list is used for determining the order of weight vectors in a code book, the number of non-zero elements among the elements of a vector indicating the difference between two adjacent vectors is minimized, and the number of elements changing between the two adjacent vectors is minimized. If only one element among the L elements changes at each change in a list, the list will be an optimum minimal changing list. To simplify the eigen method, the present invention uses non-binary gray encoding.

The non-binary gray encoding extends binary gray encoding such that the binary gray encoding can be applied to an arbitrary digit system including a binary system. In the case of a ternary system, a weight vector composed of three elements can be expressed as a minimal changing list resulting from non-binary gray encoding as shown in Equation (10).

$$C_w = \begin{bmatrix} 0000000001111111112222222222 \\ 0001112222222000111111222000 \\ 0122011200122011200122201120 \end{bmatrix} \quad (10)$$

Hereinafter, embodiments of the present invention will be described in detail with reference to the attached drawings. FIG. 1 is a diagram illustrating the configuration of a mobile communication system using transmit diversity. An i-th mobile station 11 searches for an optimum weight based on channel information received from each of antennas 15 and 16 using an optimum weight estimator 12. A founded optimum weight is fed back to a base station. The information fed back to the base station is interpreted by a feedback information decoder 14 and used as a weight for each of the antennas 15 and 16.

Figure 2:
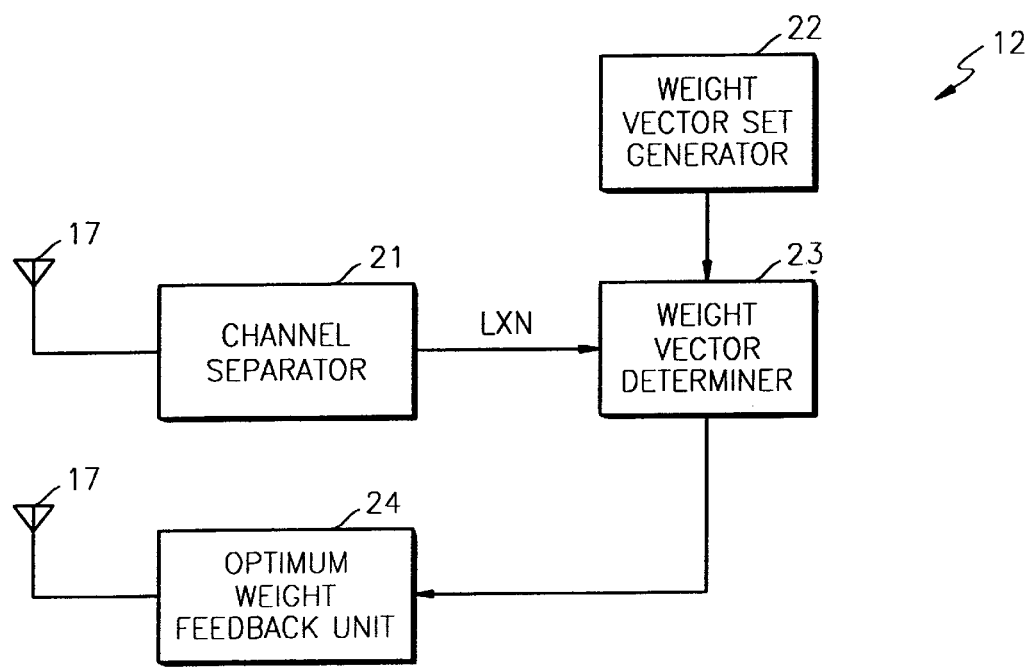
FIG. 2 is a block diagram illustrating an optimum weight estimator according to an embodiment of the present invention.

FIG. 2 is a block diagram illustrating an optimum weight estimator according to an embodiment of the present invention. The optimum weight estimator 12 of a mobile station includes a channel separator 21, a weight vector set generator 22, a weight vector determiner 23 and an optimum weight feedback unit 24.

The channel separator 21 generates and outputs a matrix signal from a received signal. The channel separator 21 will be described later in more detail with reference to FIG. 3. The weight vector set generator 22 outputs an encoded weight vector set. While a weight vector is output according to conventional technology, the difference between weight vectors is output according to the present invention. The lookup table mode weight vector determiner 23 using an eigen method outputs an optimum weight based on a L×N channel matrix and the output signal of the weight vector set generator 22. The optimum weight feedback unit 24 converts an intermediate frequency (IF) into a radio frequency (RF) to transmit the optimum weight to the base station.

Figure 3:
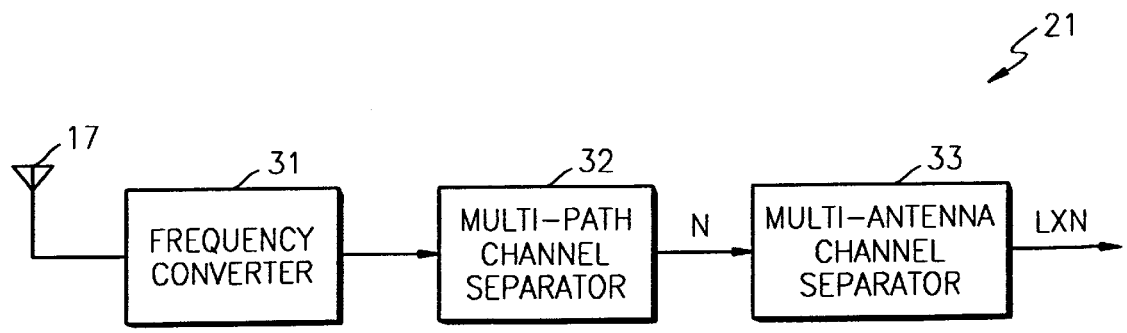
FIG. 3 is a block diagram illustrating the channel separator of FIG. 2.

FIG. 3 is a block diagram illustrating the channel separator 21 of FIG. 2. A frequency converter 31 converts RF received from the antennas 15 and 16 into IF. A multi-path channel separator 32 separates a multi-path channel from the received signal in response to the output signal of the frequency converter 31. A channel separated from an N-path signal is composed of N elements. Path separated channel information is separated into L antenna channels by a multi-antenna channel separator 33 and output as an L×N matrix signal.

Figure 4:
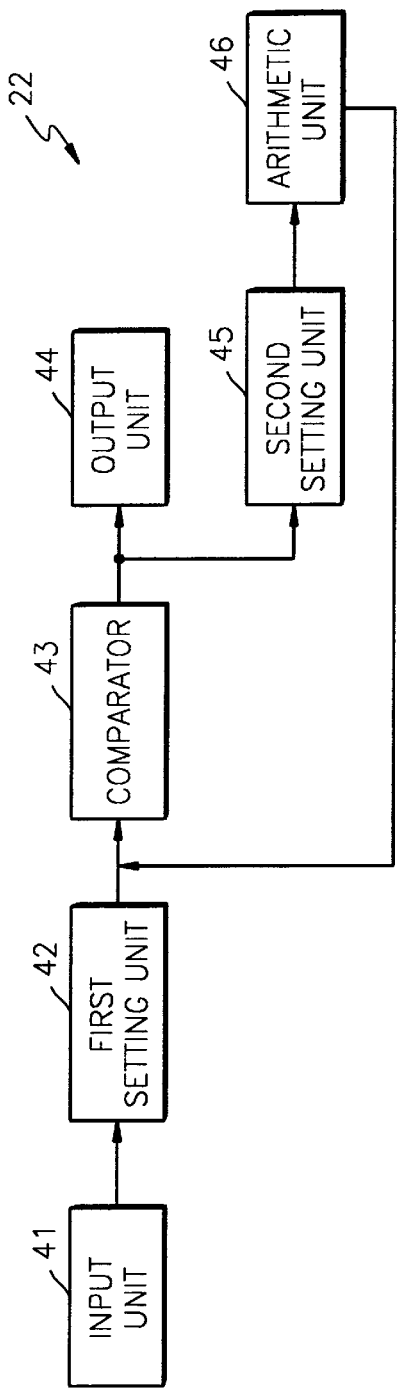
FIG. 4 is a block diagram illustrating the weight vector set generator of FIG. 2.

FIG. 4 is a block diagram illustrating the weight vector set generator 22 of FIG. 2. An input unit 41 receives the number of possible values of an optimum weight for each antenna and the number of antennas. A first setting unit 42 sets the value of 1× an output vector corresponding to the number of antennas to 0 when it stores the number of possible values of an optimum weight for each antenna to the power of the number of antennas in a number of iterations storage register. The first column in an output matrix that is the product of the value of the number of iterations storage register and the number of antennas is filled with the output vector. The first element of a non-zero element index in the output matrix is set to 1. The value of an iteration register is set to 2.

A comparator 43 compares the value of the iteration register with the value of the number of iterations storage register. When the value of the iteration register exceeds the value of the number of iterations storage register, an output unit 44 outputs the output matrix and the non-zero element index of the output matrix. Then, the operation ends. When the value of the iteration register is smaller than the value of the number of iterations storage register, a second setting unit 45 sets the value of a position register to 1 and the value of a result storage register to the result of subtracting 1 from the value of the iteration register.

The arithmetic unit 46 performs a modular operation on the value of the result storage register using the number of possible values of an optimum weight for each antenna. When the result of the modular operation is 0, the value of the position register is increased by 1, and a value obtained by fixing to an integer a value obtained by dividing the value of the result storage register by the number of possible values of an optimum weight for each antenna is set as a new value of the result storage register. When the result of the modular operation is not 0, a value obtained by performing a modular operation on the result of adding one to the output vector value of an address corresponding to the value of the position register using the number of possible values of an optimum weight for each antenna is set as a new output vector value of the address corresponding to the value of the position register. The next column in the output matrix register is set as the value of an output vector register. The value of the iteration register is increased by 1, and the result value of the increase is sent to the comparator 43 to repeatedly perform the above operations.

Figure 5:
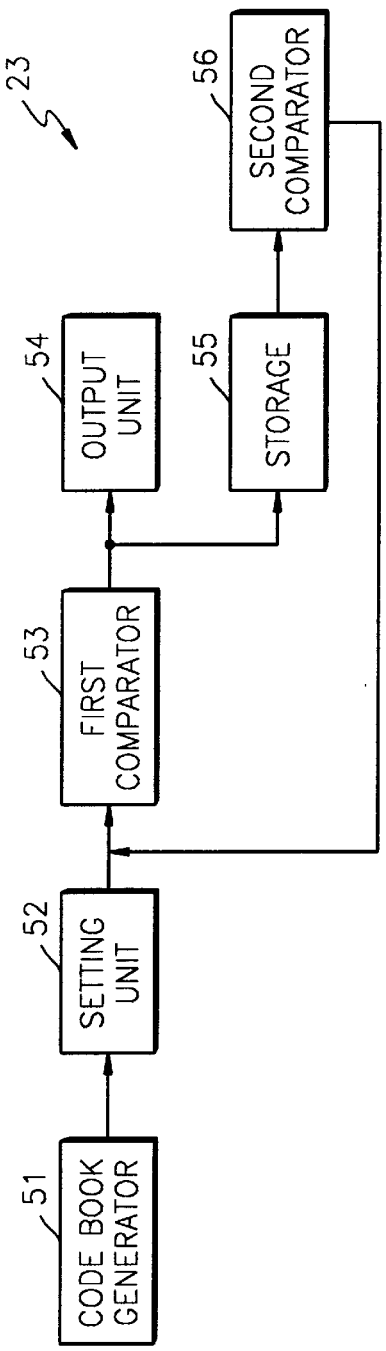
FIG. 5 is a block diagram illustrating the weight vector determiner of FIG. 2.

FIG. 5 is a block diagram illustrating the weight vector determiner 23 of FIG. 2. A code book generator 51 brings combinable code book vector information from a base gray function and generates a code book table. In addition, the code book generator 51 generates a difference code book table composed of differences between adjacent vectors in the code book table.

A setting unit 52 brings an initial weight vector from the code book table and generates the product of a correlation matrix of a channel matrix and the initial weight vector. The setting unit 52 also set a maximum receiving power to 0, a maximum receiving signal index to 1, the value of an iteration register to 2, and the value of a receiving power register to 0.

A first comparator 53 compares the value of the iteration register with 1. When the value of the iteration register is equal to or smaller than 1, the first comparator 53 brings a difference weight vector at an address corresponding to the value of the iteration register in the difference code book table to a first register and brings a difference weight vector index at an address corresponding to the value of the iteration register to a position register. The first comparator 53 also multiplies a vector at an address corresponding to the value of the position register in the channel correlation matrix by the value of the first register and stores the multiplied result in a second register. Moreover, the first comparator 35 calculates the double of a value corresponding to a real number in the product of the conjugate value of the first register and a third register vector and stores the result in a fourth register. The first comparator 35 sums the third register vector and a second register vector and stores the result as a new third register vector. The first comparator 35 also sums the existing value of the receiving power register, the value of the fourth register and the result of multiplying the conjugate value of the first register by an element at an address corresponding to the value of the position register of the second register vector and stores the summed result as a new value of the receiving power register. Alternatively, when the value of the iteration register exceeds 1, the operation ends, and a maximum receiving power index is output by an output unit 54.

A second comparator 56 compares the value of the receiving power register with the maximum receiving power. When the value of the receiving power register exceeds the maximum receiving power, the second comparator 56 replaces the maximum receiving power with the value of the receiving power register and replaces the maximum receiving power index with the value of the iteration register. On the other hand, when the value of the receiving power register is equal to or smaller than the maximum receiving power, the second comparator 56 increases the value of the iteration register and stops the current operation. The output unit 54 outputs the maximum receiving power index.

Figure 6:
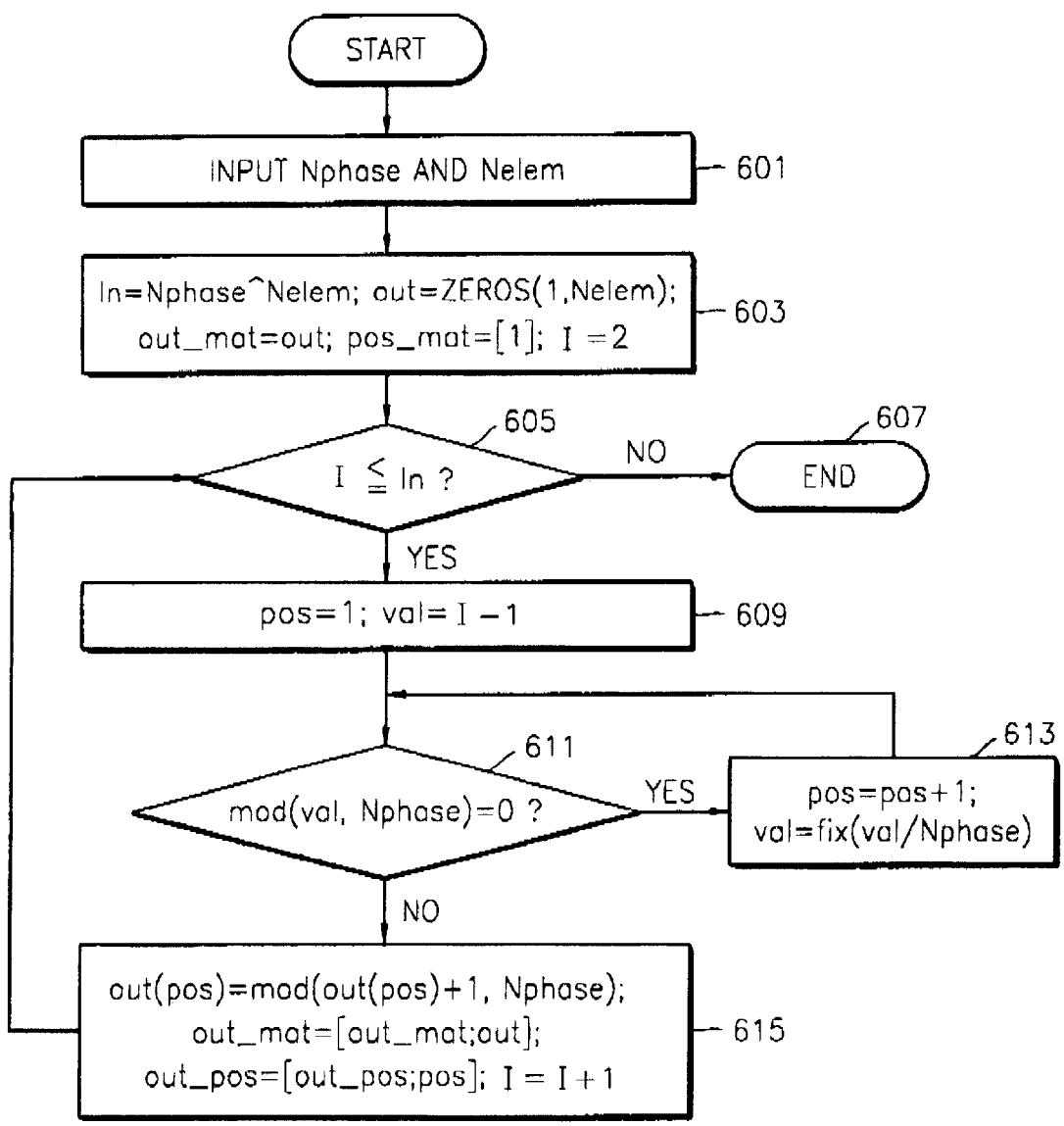
FIG. 6 is a flowchart illustrating an embodiment of an algorithm of non-binary gray encoding performed by the weight vector set generator of FIG. 2.

FIG. 6 illustrates an embodiment of an algorithm of non-binary gray encoding performed by the weight vector set generator 22 of FIG. 2. In step 601, the number of possible values of an optimum weight for each antenna, Nphase, and the number of antennas, Nelem, are received.

In step 602, the value of 1× an output vector, out, corresponding to the number of antennas, Nelem, is set to 0 when the number of possible values of an optimum weight for each antenna, Nphase, to the power of the number of antennas, Nelem, is stored in a number of iterations storage register, In. The first column in an output matrix out_mat that is the product of the value of the number of iterations storage register, In, and the number of antennas, Nelem, is filled with the output vector, out. The first element of a non-zero element index, pos_mat, in the output matrix is set to 1. The value I of an iteration register is set to 2.

When it is determined that the value of the iteration register, I, exceeds the value of the number of iterations storage register, In, in step 603, step 609 is performed next. When it is determined that the value of the iteration register, I, is smaller than the value of the number of iterations storage register, In, in the step 603, step 607 is performed next. In step 607, the output matrix out_mat and the non-zero element index pos_mat of the output matrix are output. Then, the operation ends. In step 609, the value of a position register, pos, is set to 1, and the value of a result storage register, val, is set to the result of subtracting 1 from the value of the iteration register, I.

When it is determined that the result of performing a modular operation on the value of the result storage register, val, using the number of possible values of an optimum weight for each antenna, Nphase, is 0 in step 611, step 613 is performed next. When it is determined that the result of the modular operation is not 0 in step 611, step 615 is performed next. In step 613, the value of the position register, pos, is increased by 1, and a value, fix, obtained by fixing to an integer a value obtained by dividing the value of the result storage register, val, by the number of possible values of an optimum weight for each antenna, Nphase, is set as a new value of the result storage register, val.

In step 615, a value obtained by performing a modular operation on the result of adding one to the output vector value, out, of an address corresponding to the value of the position register, pos, using the number of possible values of an optimum weight for each antenna, Nphase, is set as a new output vector value, out, of the address corresponding to the value of the position register, pos, and the next column in the output matrix out_mat register is set as the value of an output vector register, out. The value of the iteration register, I, is increased by 1. The operation progress goes back to step 605, and the next operation is performed.

Figure 7:
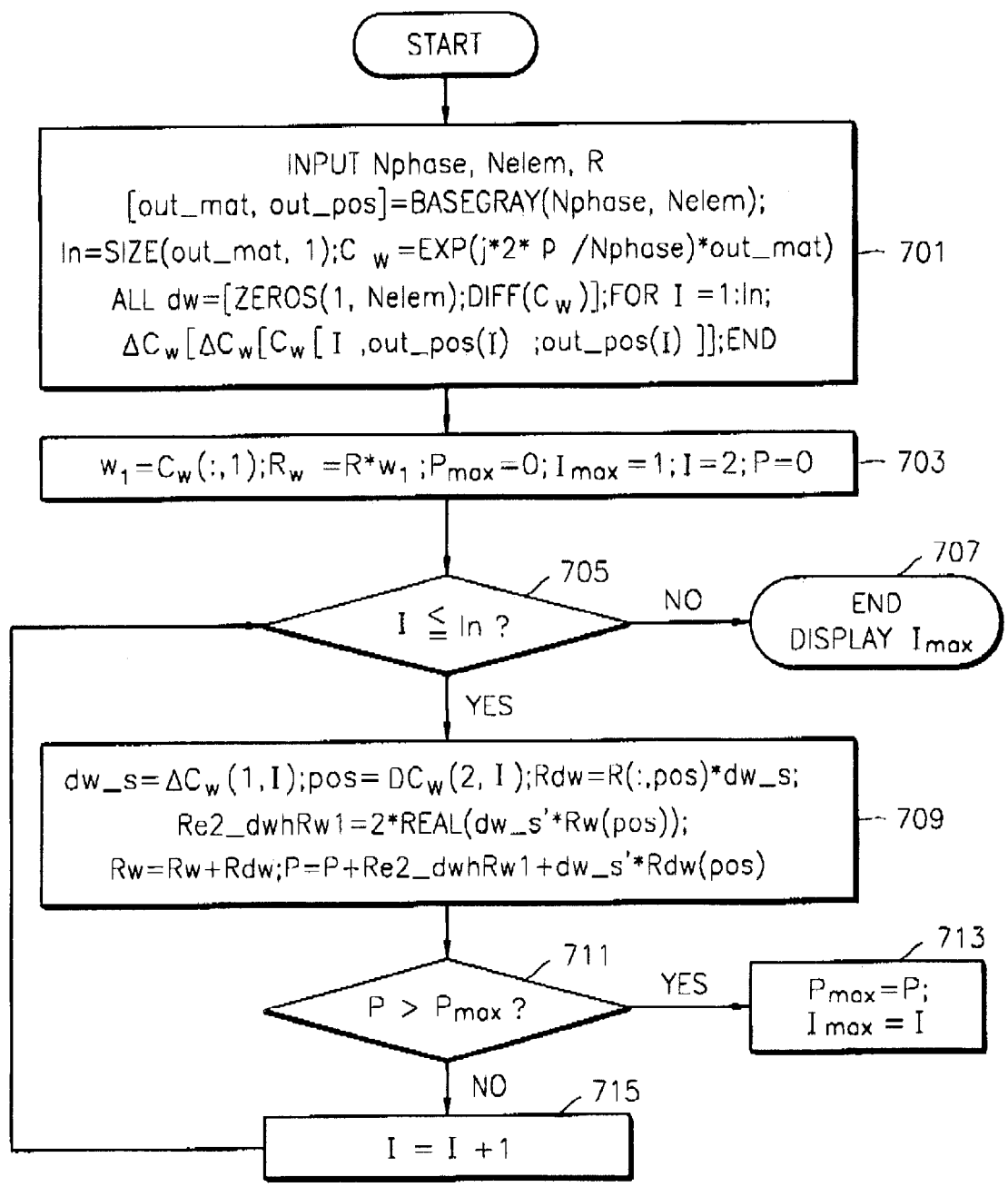
FIG. 7 is a flowchart illustrating an embodiment of an algorithm of an eigen method using a lookup table method performed by the weight vector determiner of FIG. 2.

FIG. 7 illustrates an embodiment of an algorithm of an eigen method using a lookup table method performed by the weight vector determiner 23 of FIG. 2. Step 701 is a preparing step for the this algorithm. Here, combinable code book vector information is brought from a base gray function, and a code book table $C_w$ is generated. In addition, a difference code book table $\Delta C_w$ composed of differences between adjacent vectors in the code book table is generated.

In step 703, an initial weight vector $w_1$ is brought from the code book table $C_w$. The product $R_w$ of a channel correlation matrix R and the initial weight vector $w_1$ is generated. A maximum receiving power $P_{max}$ is set to 0, and a maximum receiving signal index $I_{max}$ is set to 1. The value of an iteration register, I, is set to 2, and the value of a receiving power register, P, is set to 0.

When it is determined that the value of the iteration register, I, is equal to or smaller than 1 in step 705, step 709 is performed next. When it is determined that the value of the iteration register, I, exceeds 1 in step 705, step 707 is performed next. In step 707, the algorithm ends, and the maximum receiving signal index $I_{max}$ is output.

In step 709, a difference weight vector at an address corresponding to the value of the iteration register, I, in the difference code book table $\Delta C_w$ is brought as the value of a first register, dw_s. A difference weight vector index at an address corresponding to the value of the iteration register, I, is brought as the value of a position register, pos. The result of multiplying a vector at an address corresponding to the value of the position register, pos, in the channel correlation matrix by the value of the first register, dw_S, is stored as the value of a second register, Rdw. The double of a value corresponding to a real number in the product of the conjugate value of the first register value dw_s and a third register vector Rw is stored as the value of a fourth register, Re2_dwhRw1. The sum of the third register vector Rw and the second register vector Rdw is stored as a new third register vector, Rw. The sum of the existing value of the receiving power register, P, the value of the fourth register, Re2_dwhRw1, and the result of multiplying the conjugate value of the first register by an element at an address corresponding to the value of the position register, pos, in the second register vector Rdw is stored as a new value of the receiving power register, P.

When it is determined that the value of the receiving power register, P, exceeds the maximum receiving power $P_{max}$ in step 711, step 713 is performed next. When it is determined that the value of the receiving power register, P, is equal to or smaller than the maximum receiving power $P_{max}$ in step 711, step 715 is performed. In step 713, the maximum receiving power $P_{max}$ is replaced with the value of the receiving power register, P, and the maximum receiving power index $I_{max}$ is replaced with the value of the iteration register, I. In step 715, the value of the iteration register, I, is increased by 1. Then, step 705 is performed next.

In an optimum weight estimator of closed loop transmit diversity for mobile communication according to the present invention, calculation for estimating an optimum weight is more simple than in a conventional weight estimator. When a difference code book method according to the present invention was compared with a conventional code book method in TI DSP TMS320C6x, the amount of calculation was reduced to ¾ when 4 antennas and 4 phases were used and to ⅓ when 8 antennas and 2 phases were used. When a difference code book method using a lookup table to reduce the amount of redundant calculation is used, the amount of calculation is more reduced.

A weight of transmit diversity is obtained in a mobile station. By reducing the complexity of calculation performed in the mobile station, power loss resulting from the calculation can be reduced. The present invention minimizes the power loss of a mobile station by reducing the amount of calculation of weights in transmit diversity employed for improving the performance of the mobile station.

Since an algorithm for obtaining a weight with simple calculation is provided, a signal processing hardware module used in a mobile station can be simplified, thereby decreasing the manufacturing cost of mobile stations. When a digital signal processor (DSP) is used as signal processing hardware, general processing is possible so that a system can be configured with general software and hardware tools. Therefore, time to market can be decreased, and a low cost low power apparatus may be obtained.

Although the invention has been described with reference to particular embodiments, the embodiments should be construed in a descriptive sense only. It will be apparent to one of ordinary skill in the art that modifications to the described embodiments may be made. Therefore, the true scope of the present invention should be defined by the spirit of the attached claims.

What is claimed is:

1. An optimum weight estimator of a mobile station in a mobile communication system in which a base station uses closed transmit diversity technology, the optimum weight estimator comprising:

a channel separator for separating a multi-path channel from a signal of the base station and outputting a channel matrix signal;

a weight vector set generator for encoding a weight using a fixed point method and outputting a weight vector matrix signal;

a weight vector determiner for outputting an optimum weight in response to the channel matrix signal and the weight vector matrix signal; and an optimum weight feedback unit for outputting a signal for feeding back the optimum weight signal to the base station.

2. The optimum weight estimator of claim 1, wherein the channel separator comprises:

an antenna;

a frequency converter for converting a radio frequency signal received through the antenna into an intermediate frequency signal;

a multi-path channel separator for separating information of a plurality of channels from the intermediate frequency signal; and a multi-antenna channel separator for separating the information of the plurality of channels into a plurality of antenna channels and outputting as the channel matrix signal the product of the information of the plurality of channels and the plurality of antenna channels.

3. The optimum weight estimator of claim 1, wherein the weight vector matrix signal is set as a minimal changing list which minimizes the variation of the difference between two adjacent vectors.

4. The optimum weight estimator of claim 1, wherein the weight vector matrix signal is set as a difference minimal changing list indicating the differences between two adjacent vectors in the minimal changing list.

5. The optimum weight estimator of claim 1, wherein the weight vector set generator comprises:

an input unit for receiving the number of possible values of an optimum weight for each antenna and the number of antennas;

a first setting unit for setting the value of an output vector corresponding to the number of antennas to 0 when it stores the number of possible values of an optimum weight for each antenna to the power of the number of antennas in a number of iterations storage register, filling the first column in an output matrix that is the product of the value of the number of iterations storage register and the number of antennas with the output vector, setting the first element of a non-zero element index in the output matrix to 1, and setting the value of an iteration register to 2;

a comparator for comparing the value of the iteration register with the value of the number of iterations storage register;

an output unit for outputting the output matrix and a non-zero element index of the output matrix;

a second setting unit for setting the value of a position register to 1 and the value of a result storage register to a value obtained by subtracting 1 from the value of the iteration register; and an arithmetic unit for performing a modular operation on the value of the result storage register using the number of possible values of an optimum weight for each antenna.

6. The optimum weight estimator of claim 1, wherein the weight vector determiner comprises:

a code book generator for generating a code book table and a difference code book table;

a setting unit for setting maximum receiving power, a maximum receiving signal index, the value of a iteration register and the value of a receiving power register to predetermined values, respectively;

a first comparator for comparing the value of the iteration register with a predetermined value;

output unit for outputting a maximum receiving power index;

storage for calculating a weight based on the difference code book and storing it as the value of a receiving power register; and a second comparator for comparing the value of the receiving power register with the maximum receiving power.

7. The optimum weight estimator of claim 1, wherein the optimum weight comprises a weight maximizing the receiving signal to interference/noise ratio of the mobile station.

8. The optimum weight estimator of claim 1, wherein the weight vector determiner outputs weights according to a lookup table method using an eigen method.

9. The optimum weight estimator of claim 1, wherein the encoding comprises non-binary gray encoding.

10. An optimum weight estimating method of a mobile station in a mobile communication system in which a base station uses closed transmit diversity technology, the optimum weight estimating method comprising the steps of:

(a) separating a multi-path channel from a signal of the base station and outputting a channel matrix signal;

(b) encoding a weight using a fixed point method and outputting a weight vector matrix signal;

(c) outputting an optimum weight in response to the channel matrix signal and the weight vector matrix signal; and (d) outputting a signal for feeding back the optimum weight signal to the base station.

11. The optimum weight estimating method of claim 10, wherein step (a) comprises the steps of:

(11a) receiving a signal from the base station;

(11b) converting the signal received in step (11a) into an intermediate frequency signal;

(11c) separating information of a plurality of channels from the intermediate frequency signal obtained in step (11b); and (11d) separating the information of the plurality of channels obtained in step (11c) into a plurality of antenna channels and outputting as the channel matrix signal the product of the information of the plurality of channels and the plurality of antenna channels.

12. The optimum weight estimating method of claim 10, wherein the weight vector matrix signal is set as a minimal changing list which minimizes the variation of the difference between two adjacent vectors.

13. The optimum weight estimating method of claim 10, wherein the weight vector matrix signal is set as a difference minimal changing list indicating the differences between two adjacent vectors in the minimal changing list.

14. The optimum weight estimating method of claim 10, wherein step (b) comprises the steps of:

(14a) receiving the number of possible values of an optimum weight for each antenna and the number of antennas;

(14b) setting the value of an output vector corresponding to the number of antennas to 0 when it stores the number of possible values of an optimum weight for each antenna to the power of the number of antennas in a number of iterations storage register, filling the first column in an output matrix that is the product of the value of the number of iterations storage register and the number of antennas with the output vector, setting the first element of a non-zero element index in the output matrix to 1, and setting the value of an iteration register to 2;

(14c) performing step (14d) when the value of the iteration register exceeds the value of the number of iterations storage register and performing step (14e) when the value of the iteration register is equal to or smaller than the value of the number of iterations storage register;

(14d) outputting the output matrix and a non-zero element index of the output matrix and ending an operation;

(14e) setting the value of a position register to 1 and the value of a result storage register to a value obtained by subtracting 1 from the value of the iteration register;

(14f) performing step (14g) when the result of performing a modular operation on the value of the result storage register using the number of possible values of an optimum weight for each antenna is 0 and performing the step (14h) when the result is not 0;

(14g) increasing the value of the position register by 1 and setting a value obtained by fixing to an integer a value obtained by dividing the value of the result storage register by the number of possible values of an optimum weight for each antenna as a new value of the result storage register; and (14h) setting a value obtained by performing a modular operation on the result of adding one to the output vector value of an address corresponding to the value of the position register, using the number of possible values of an optimum weight for each antenna as a new output vector value of the address corresponding to the value of the position register, setting the next column in the output matrix register as the value of an output vector register, increasing the value of the iteration register by 1, and going back to step (14c) to perform the next operation.

15. The optimum weight estimating method of claim 10, wherein step (c) comprises the steps of:

(15a) bringing combinable code book vector information from a base gray function, generating a code book table, and generating a difference code book table composed of differences between adjacent vectors in the code book table;

(15b) bringing an initial weight vector from the code book table, generating the product of a channel correlation matrix and the initial weight vector, and setting a maximum receiving power to 0, a maximum receiving signal index to 1, the value of an iteration register to 2 and the value of a receiving power register to 0;

(15c) performing step (15e) when the value of the iteration register is equal to or smaller than 1, and performing step (15d) when the value of the iteration register exceeds 1;

(15d) ending an operation and outputting the maximum receiving signal index;

(15e) bringing a difference weight vector at an address corresponding to the value of the iteration register in the difference code book table as the value of a first register, bringing a difference weight vector index at an address corresponding to the value of the iteration register as the value of a position register, storing the result of multiplying a vector at an address corresponding to the value of the position register in the channel correlation matrix by the value of the first register as the value of a second register, storing the double of a value corresponding to a real number in the product of the conjugate value of the first register value and a third register vector as the value of a fourth register, storing the sum of the third register vector and a second register vector as a new third register vector, and storing the sum of the existing value of the receiving power register, the value of the fourth register and the result of multiplying the conjugate value of the first register by an element at an address corresponding to the value of the position register in the second register vector as a new value of the receiving power register;

(15f) performing step (15g) when the value of the receiving power register exceeds the maximum receiving power and performing step (15h) when the value of the receiving power register is equal to or smaller than the maximum receiving power;

(15g) replacing the maximum receiving power with the value of the receiving power register and replacing the maximum receiving power index with the value of the iteration register; and (15h) increasing the value of the iteration register and performing step (15c).

16. The optimum weight estimating method of claim 15, wherein step (15e) comprises the steps of:

bringing the difference weight vector at the address corresponding to the value of the iteration register in the difference code book table as the value of the first register and bringing the difference weight vector index at the address corresponding to the value of the iteration register as the value of the position register;

bringing a column vector composed of the values of the first register and the position register of a result storage of the second register as the value of the second register when the pattern of the column vector composed of the values of the first register and the position register is the same as one of the previous patterns, and setting the value of the second register to a value obtained by multiplying a vector at an address corresponding to the value of the position register in the channel correlation matrix by the value of the first register and storing the set value as the column vector indicating an address of the result storage when the pattern of the column vector is a new one; and storing the double of a value corresponding to a real number in the product of the conjugate value of the first register value and a third register vector as the value of a fourth register, storing the sum of the third register vector and a second register vector as a new third register vector, and storing the sum of the existing value of the receiving power register, the value of the fourth register and the result of multiplying the conjugate value of the first register by an element at an address corresponding to the value of the position register in the second register vector as a new value of the receiving power register.

17. The optimum weight estimating method of claim 10, wherein the encoding in step (b) comprises non-binary gray encoding.

18. The optimum weight estimating method of claim 10, wherein the optimum weight is output according to a lookup table method using an eigen method in step (c).

* * * * *